United States Patent [19]
Wada et al.

[11] Patent Number: 5,092,166
[45] Date of Patent: Mar. 3, 1992

[54] APPARATUS FOR DETERMINING SHAPE OF CONTACT PATCH AND CONTACT PRESSURE OF TIRES

[75] Inventors: Yasuo Wada, Amagasaki; Akira Kajikawa, Kobe, both of Japan

[73] Assignee: Sumitomo Rubber Industries, Ltd., Hyogo, Japan

[21] Appl. No.: 646,087

[22] Filed: Jan. 28, 1991

[30] Foreign Application Priority Data

Feb. 1, 1990 [JP] Japan .................................. 2-22798

[51] Int. Cl.$^5$ ............................................ G01M 17/02
[52] U.S. Cl. .......................................... 73/146; 356/71
[58] Field of Search ............................. 73/146; 356/71

[56] References Cited

U.S. PATENT DOCUMENTS

| 3,865,488 | 2/1975 | Del Rio | 356/71 |
| 4,331,030 | 5/1982 | Webster | 73/146 |
| 4,878,712 | 4/1975 | Chapin | 73/146 |

FOREIGN PATENT DOCUMENTS

| 3411584 | 10/1985 | Fed. Rep. of Germany | 73/146 |
| 58-191953 | 11/1983 | Japan . | |

OTHER PUBLICATIONS

Spinner, "An Apparatus for Determining the Actual Footprint Area of Tires", Material Research and Standards, vol. 10, No. 2, pp. 20-23, Feb. 1970.

Primary Examiner—Donald O. Woodiel
Attorney, Agent, or Firm—Birch, Stewart, Kolasch & Birch

[57] ABSTRACT

An apparatus for determining the shape of contact patch and the contact pressure of a tire comprises a contact member made of a transparent material, a pressing unit for pressing the outer peripheral surface of the tire against the contact member, a sheet having elastic projections arranged regularly on one surface thereof and uniformly distributed thereover, and an observation device for observing through the contact member the projections as deformed when the tire is pressed against the contact member with the sheet interposed therebetween and with the projections thereof facing the contact member. The shape of contact patch and contact pressure of the tire can be determined by observing deformed projections by the device.

13 Claims, 4 Drawing Sheets

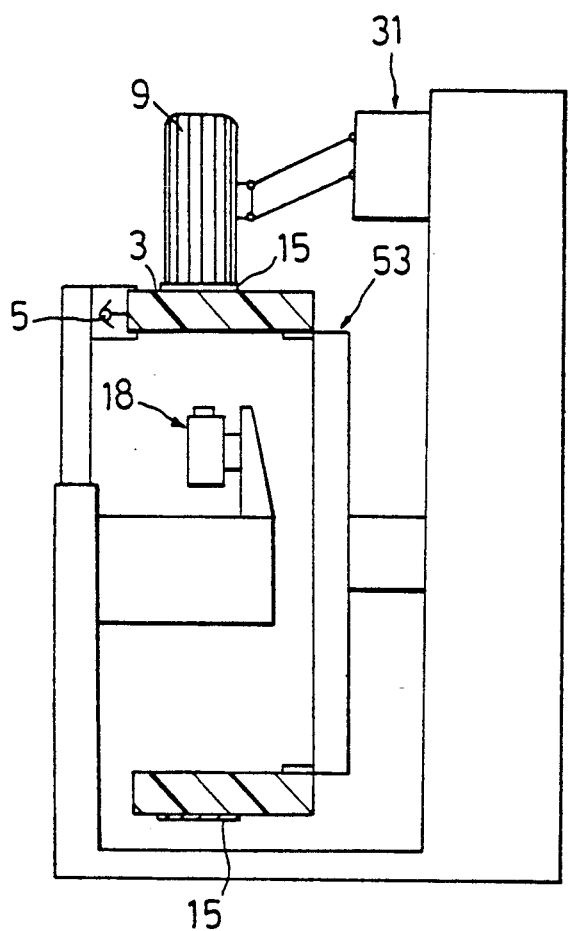
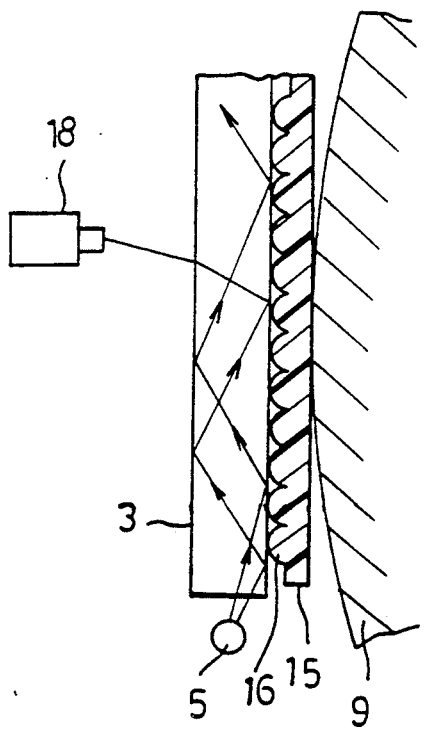

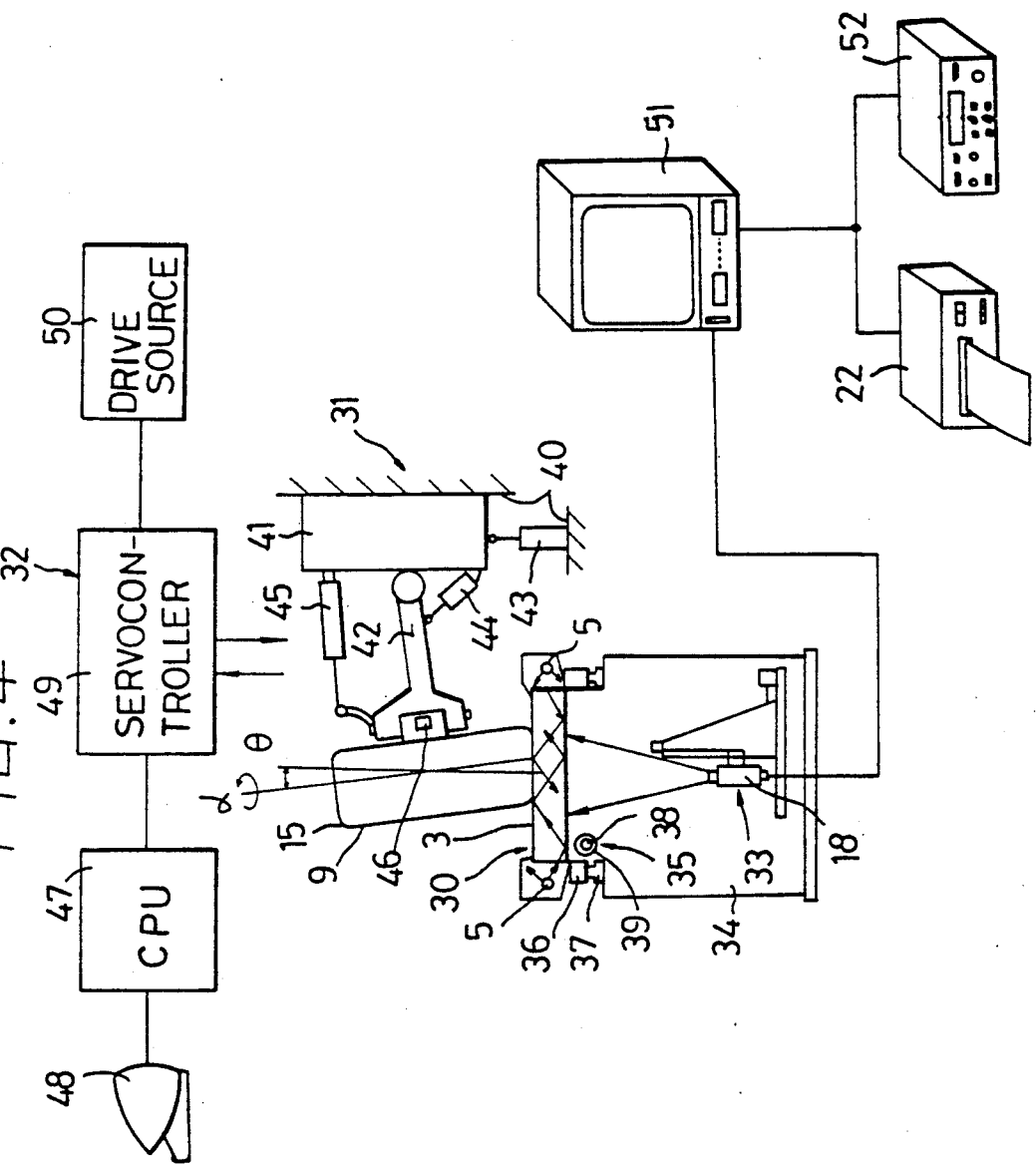

APPARATUS FOR DETERMINING SHAPE OF CONTACT PATCH AND CONTACT PRESSURE OF TIRES

FIELD OF THE INVENTION AND RELATED ART STATEMENT

The present invention relates to apparatus for determining the shape of contact patch and the contact pressure of tires.

For example, Unexamined Japanese Patent Publication SHO 58-191953 discloses an apparatus for measuring the contact pressure of tires.

The conventional apparatus employs pressure sensitive paper placed on a flat plate and an elastic sheet having projections arranged regularly on its one surface and placed over the pressure sensitive paper, with the projections facing the pressure sensitive paper. The tire to be tested is caused to rotate on the elastic sheet under a predetermined contact pressure to mark a diagram of distribution of contact pressures on the pressure sensitive paper.

Also known in the prior art are an apparatus which employs a multiplicity of pressure sensors embedded in a tire contact area for causing a tire to rotate thereon to determine the distribution of contact pressures over the contact area, and an apparatus wherein ink is applied to the peripheral surface of the tire to transfer the ink from the tire surface to a paper and produce an impression of contact patch thereon.

The apparatus employing the pressure sensitive paper has the problem of failing to produce a satisfactory color impression if the contact pressure is low. Since the density of color produced on the pressure sensitive paper is dependent on the temperature and humidity, it is difficult to quantitatively determine the contact pressure. There is another problem in that the pressure sensitive paper is expensive.

Further the apparatus including many embedded pressure sensors which are expensive has the problem of being costly and failing to achieve improved measuring accuracy since the sensors can not be made very small in diameter.

Further when ink is applied to the tire, the tire, which is soiled with the ink, is not satisfactorily usable for other tests, while once the tire contacts the paper, the paper tends to turn up partially due to shrinkage of rubber and the ink adheres to the partially turned-up paper to produce an impression of contact patch which is larger than actually in length or width.

OBJECT AND SUMMARY OF THE INVENTION

Accordingly, an object of the present invention is to provide an apparatus for determining the shape of contact patch and contact pressure of tires which is capable of determining the shape of contact patch and the distribution of contact pressure of the tire easily at a low cost and with high accuracy.

To fulfill the above object, the present invention provides the following means.

Stated specifically, the present invention provides an apparatus for determining the shape of contact patch of a tire and the contact pressure thereof characterized in that the apparatus comprises:
  a contact member made of a transparent material,
  a pressing unit for pressing the outer peripheral surface of the tire against the contact member,
  a sheet having elastic projections arranged regularly on one surface thereof and uniformly distributed thereover, and
  an observation device for observing through the contact member the projections as deformed when the tire is pressed against the contact member with the sheet interposed therebetween and with the projections thereof facing the contact member.

The sheet comprises a base of uniform thickness, the base having a flat surface over one side thereof and the elastic projections over the other side thereof, the projections being so shaped that when the sheet is subjected to a pressure on the flat side of the base with the tips of the projections in contact with a planar surface, the area of contact of the projections with the planar surface varies with the pressure.

The sheet is made of rubber and has a light color over the surface having the projections.

The projections are semispherical in shape and are arranged closely.

The contact member comprises a transparent glass plate having a uniform thickness and is provided at outer ends thereof with lamps, the lamps being so disposed that the light therefrom is confined within the thickness of the glass plate without emerging from the surface of the glass plate.

The sheet is provided on the surface of the contact member with the projections thereof in contact with the surface.

The contact member is attached to a mount rotatable about a horizontal axis so as to position the surface of the contact member approximately vertically, the pressing unit being positioned in front of the contact member, the pressing unit comprising a saddle horizontally movable toward the contact member for removably mounting the tire thereon with the axis of the tire positioned vertically, and drive means for moving the saddle.

The saddle is coupled to the drive means by load detecting means, and the drive means has connected thereto a control unit for controlling the drive means so that the value detected by the load detecting means is made a predetermined value.

The observation device comprises image pickup means disposed in the rear of the contact member, an image processing unit for processing the image from the image pickup means, and a computer for controlling the image processing unit.

The contact member comprises a transparent glass plate having a uniform thickness, the glass plate being provided on a support so as to be movable horizontally with its surface positioned horizontally, and the pressing unit holds the tire with its axis positioned horizontally and presses the surface of the tire against the contact member with the sheet interposed therebetween.

The pressing unit comprises a frame fixed to a floor, a slide provided on the fixed frame and movable upward and downward, and a pivotal arm assembly provided on the slide for removably and rotatably supporting the tire as rimmed and inflated to a specified internal pressure to render the camber angle and slip angle of the tire adjustable.

The sheet can be provided around the outer peripheral surface of the tire.

The contact member can be a rotary drum in the form of a hollow cylinder. In this case, the pressing unit is disposed outside the contact member, and the observation device inside thereof.

According to the present invention, the outer peripheral surface of the tire is pressed by the pressing unit against the contact member made of a transparent material. At this time, the sheet is interposed between the contact member and the tire outer peripheral surface, with the projections facing the contact member.

Some projections of the sheet are elastically deformed by the contact pressure of the tire. More specifically, the projections over the contact area of the tire are elastically deformed, while the projections outside the contact area remain free of elastic deformation. The amount of elastic deformation of projections varies with the magnitude of the contact pressure.

Accordingly, the area of deformation of projections indicates the shape of tire contact patch. Further the distribution of contact pressures of tire can be determined from the amounts of deformation of projections.

According to the present invention, therefore, the contact member is made of a transparent material to make the deformation of projections observable. The observation device is used for observing the deformation of projections of the sheet.

The shape of tire contact patch and tire contact pressure distribution can be quantitatively determined by the apparatus of the invention with a higher efficiency, at a lower cost and with higher accuracy than by the conventional apparatus using pressure sensitive paper or the like.

Furthermore, the shape of tire contact patch and tire contact pressure distribution can be determined as observed at the eventually final stage of contact of the tire, while in the ink method (shape of contact patch) or in the pressure sensitive paper method (contact pressure distribution), the shape of tire contact patch and tire contact pressure distribution are apt to be determined at an intermediate stage of contact of the tire with the contact member.

Further with use of the image processing unit coupled directly to the image pickup means, the shape of tire contact patch and the tire contact pressure distribution can be analyzed at the same time.

BRIEF DESCRIPTION OF THE DRAWINGS

FIG. 3 is a sectional view showing a portion of the tire pressed against a contact member;

FIG. 4 is a diagram showing the construction of another embodiment of the invention;

FIG. 6 is a view partly in section and showing another embodiment of the invention.

DESCRIPTION OF THE PREFERRED EMBODIMENTS

Embodiments of the present invention will be described below with reference to the drawings.

Figure 1:
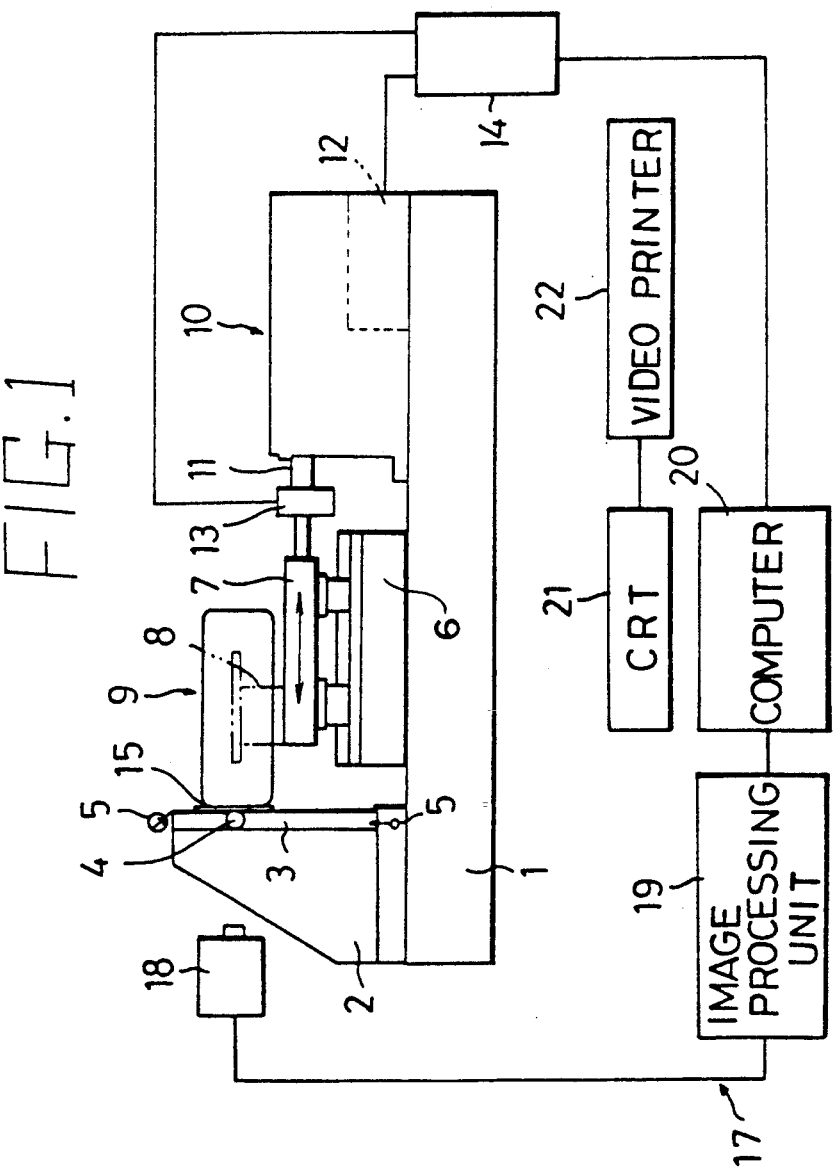
FIG. 1 is a diagram showing the construction of an apparatus embodying the invention for determining the shape of contact patch and contact pressure of tires.

FIG. 1 shows a base 1 and a mount 2 placed on the base 1. A contact member 3 is provided on the mount 2 movably about a horizontal pivot 4. The contact member 3 comprises a transparent glass plate having a uniform thickness and a flat surface. Although the contact member 3 is usually fixed to the mount 2 with its surface positioned vertically, the contact member 3 is movable about the horizontal pivot 4 manually or by an electric motor or hydraulic or like drive means (not shown) to an inclined position wherein the surface of the member 3 is at a specified angle with a vertical plane.

The contact member 3 of transparent glass plate has a quadrilateral outer periphery. Of the four sides of the periphery of the contact member 3, two to four sides are each provided with a lamp 5. The light from the lamp 5 is confined within the thickness of the glass plate without emerging from the surface of the glass plate.

Thus, the light incident on the glass plate is totally reflected at the interface between the glass surface and the air and will not emerge from the glass toward the air side.

In front of the mount 2 (on the right-hand side of FIG. 1), a pressing unit 10 is provided on the base 1. The pressing unit 10 has a slide frame 6 fixedly mounted on the base 1. A saddle 7 horizontally slidable toward the contact member 3 is mounted on the slide frame 6. A tire mount shaft 8 having a vertical axis projects upward from the saddle 7. The shaft 8 carries a rimmed tire 9 nonrotatably and removably.

The pressing unit 10 further has drive means 11 comprising a hydraulic cylinder, a hydraulic unit 12 for driving and controlling the hydraulic cylinder, etc.

The hydraulic cylinder 11 of the pressing unit 10 is coupled to the saddle 7 by a load cell 13. The load cell 13 and the hydraulic unit 12 are electrically connected to a control unit 14.

Figure 2:
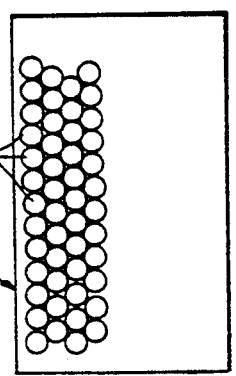
FIG. 2 is a plan view of a sheet.

A sheet 15 is interposed between the contact member 3 and the outer peripheral surface of the tire 9. The sheet 15 is removably provided on the front surface of the contact member 3. The sheet 15 has one surface which is flat and the other surface which is formed with irregularities, i.e., a multiplicity of projections 16 as seen in FIG. 2. The surface having the projections 16 is in contact with the surface of the contact member 3.

The sheet 15 is made of rubber, and the projections 16 are elastically deformable. The sheet surface having the projections is light-colored, preferably white. The sheet 15 is larger than the area of contact of the tire with the sheet. The projections 16 are preferably semispherical in shape, elastically deform in accordance with the pressure applied thereto and effectively restore to the original shape. The projections 16 are arranged closely so that the sheet 16 has the largest possible number of projections. The projections 16 are preferably 0.5 to 5.0 mm in diameter. If the diameter is small, the limit of deformation is reached at a low pressure. Excessively large diameters result in lower measuring accuracy and make it difficult to determine the contact pressure distribution over an area of minute area units.

With reference to FIG. 1, indicated 17 is an observation device which comprises image pickup means 18 disposed in the rear of the contact member 3 and comprising an industrial television camera, an image processing unit 19 for processing the image from the camera 18, a personal computer 20 for controlling the image processing unit 19 and the control unit 14, a display unit 21 for displaying the result of image processing, a video printer 22, etc.

The present embodiment having the above construction determines the shape of contact patch of the tire 9 and the contact pressure distribution thereof by the following procedure.

First, the sheet 15 is attached to the surface of the contact member 3 with the projections 16 in contact therewith. The contact member 3 is then moved about the horizontal pivot 4 and fixed to a position where the surface of the contact member 3 is at a predetermined angle (camber angle) with a vertical plane.

Next, the tire 9 as rimmed is fixed to the tire mount shaft 8.

The saddle 7 is subsequently pushed toward the contact member 3 by the pressing unit 10 to press the outer peripheral surface of the tire 9 against the sheet 15.

At this time, the pressure on the tire is detected by the load cell 13, and the detected value is fed back to the control unit 14. The control unit 14 is controlled by the computer 20 so that the load on the tire becomes a predetermined value.

Elastic projections 16 of the sheet 15 interposed between the contact member 3 and the tire 9 are elastically deformed by the pressure of the tire 9. The projections 16 over the area of contact of the tire 9 are thus elestically deformed, but those outside the contact area remain free of deformation. The amount of elastic deformation of the projections 16 is in proportion to the contact pressure of the tire 9.

The projections 16 elastically deformed are in intimate contact with the surface of the contact member 3. At this time, the rays emitted by the lamps 5 at the side faces of the contact member 3 into the contact member 3 and confined in the thickness thereof are irregularly reflected owing to the intimate contact of the projections 16 with the contact member 3 and emerge from the rear surface of the contact member 3.

Thus, the projections 16 in intimate contact with the front surface of the contact member 3 are lighted up by reflecting the light within the contact member 3 and can be observed from the rear side of the contact member 3. At this time, the projections 16 subjected to a high contact pressure appear large in diameter, whereas those under a low pressure appear small.

The projections 16 are photographed with the industrial television camera 18 disposed in the rear of the contact member 3, and the image is sent to the image processing unit 19 to measure the diameter of the intimately contacted projections 16.

The processing unit 19 has stored therein data as to amounts of deformation of the projections 16 as measured under varying contact pressures, for example, of 1 kg/cm$^2$, 2 kd/cm$^2$, ... The measurement data obtained for the image forwarded from the camera 18 is compared with the stored data to express the contact pressure measurements obtained in different colors or in contour lines.

Furthermore, the length, width, area or like of contact can be determined by subjecting the overall area of the intimatedly contacted projections 16 to image processing.

When the contact member 3 is inclined, the shape of contact patch and contact pressure distribution can be determined for the tire as given a camber angle.

Figure 5:
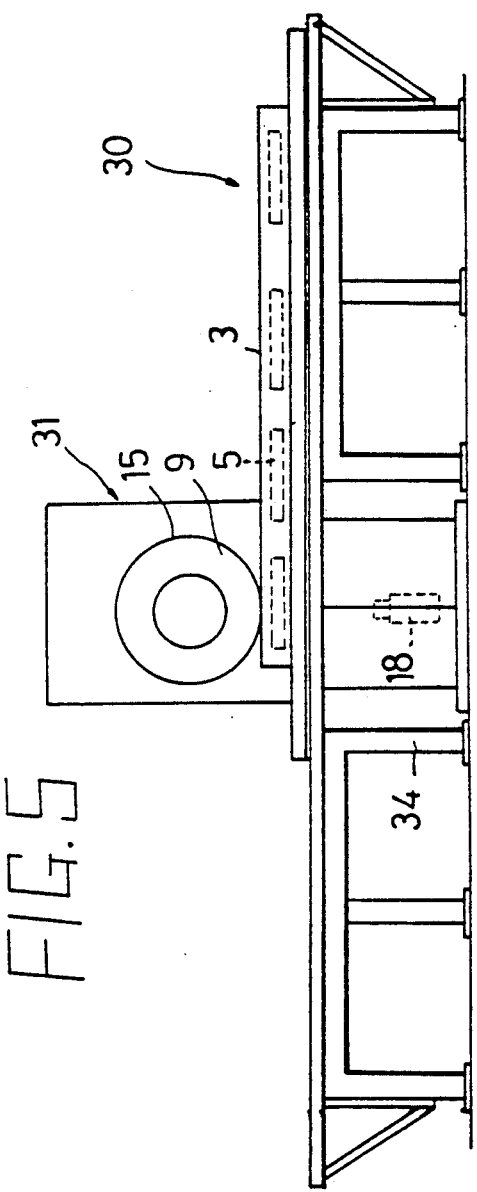
FIG. 5 is a front view of the same.

FIGS. 4 and 5 show another embodiment of the invention, which differs from the foregoing embodiment in that the contact member is adapted to move.

The illustrated apparatus for determining the shape of contact patch and contact pressure of a tire 9 comprises a movable pavement assembly 30, a pressing unit 31 for pressing the tire 9 against the assembly 30, a control system 32 for driving and controlling the assembly 30 and the unit 31, a sheet 15 adhered to the circumferential surface of the tire 9, an observation device 33 for processing an image of the contact area of the tire, etc.

The movable pavement assembly 30 comprises a support 34 fixed to a floor, a contact member 3 mounted on the support 34 and reciprocatingly movable horizontally, and drive means 35 for moving the contact member 3. The contact member 3 comprises a transparent glass plate having a predetermined thickness and smooth flat upper and lower surfaces in parallel to each other. The contact member 3 of transparent glass is supported at the lower side of its periphery by a frame 36, which is horizontally slidably supported by guide rails 37 on the support 34.

The drive means 35 comprises a feed screw 38 rotatably supported by the support 34, a nut 39 secured to the frame 36 and screwed on the feed screw 38, a hydraulic motor (not shown) for rotating the feed screw 38, etc.

Lamps 5 are arranged at opposite sides of the contact member 3 and attached to the frame 36 so that the light from the lamps 5 is confined within the thickness of the contact member 3 and will not leak through the upper and lower surfaces of the member 3 to he outside.

The tire pressing unit 31 comprises a frame 40 fixed to the floor, a slide 41 provided on the fixed frame 40 and movable upward and downward, and a pivotal arm assembly 42 provided on the slide 41 for removably and rotatably supporting the tire 9 as rimmed and inflated to a specified internal pressure to render the camber angle $\theta$ and slip angle $\alpha$ of the tire 9 adjustable.

The tire pressing unit 31 and the movable pavement assembly 30 are arranged in such a relationship with each other that the tire 9 is in contact with the upper surface of the contact member 3, with the axis of rotation of the tire 9 positioned perpendicular to the direction of travel of the contact member 3.

An upward-downward movement actuator 43 and a displacement sensor (not shown) are provided between the fixed frame 40 and the slide 41 for adjusting the level of the slide 41. Provided between the slide 41 and the pivotal arm assembly 42 are a camber angle actuator 44 and a camber angle sensor (not shown), and also a slip angle actuator 45 and a slip angle sensor (not shown). A three-component load sensor 46 is provided at the load bearing portion of the pivotal arm assembly 42.

The control system 32 comprises a computer 47, an input-output unit 48, a servocontroller 49 controllable by the computer 47, a hydraulic drive source 50 for applying oil pressure to the servocontroller 49, etc. Working oil is supplied to the hydraulic motor and actuators 43, 44, 45 via the servocontroller 49.

The control system 32 is so adapted that the movable pavement assembly 30 and the tire pressing unit 31 is automatically operated by the computer 47 according to a predetermined program.

The observation device 33 comprises a television camera 18 below the contact member 3 beneath the tire 9 mounted on the pressing unit 31, a monitor 51 for displaying the image photographed by the camera 18, a video tape recorder 52 for recording the image, a video printer 22, etc.

The apparatus shown in FIGS. 4 and 5 determines the shape of contact patch of the tire 9 and the contact pressure thereof by the following procedure.

First, the sheet 15 is adhered to the outer peripheral surface of the tire 9, with the projections 16 facing outward.

Next, the tire 9 is mounted on the pressing unit 31.

The control system 32 has stored therein a program of measuring steps and automatically sets the vertical load, camber angle and slip angle to be given to the tire 9, the speed of travel of the contact member 3, etc.

The start switch is then depressed, whereupon the pressing unit 31 and the movable pavement assembly 30 are automatically operated under the control of the system 32. More specifically, the upward-downward movement actuator 43 lowers the slide 41, bringing projections 16 of the sheet 15 around the tire 9 into contact with the contact member 3 and applying the predetermined vertical load to the tire 9. The load on the tire is detected by the three-component load sensor 46 for feedback control. The camber angle actuator 44 and the slip angle actuator 45 function to give the specified camber angle $\theta$ and slip angle $\alpha$ to the tire 9, and the contact member 3 starts to travel at the specified speed.

At the position where the tire 9 bears on the contact member 3, projections 16 of the sheet 15 are brought into intimate contact with the surface of the contact member 3, whereby the light emitted by the lamps 5 and confined within the contact member 3 without leaking is caused to emerge from the contact member upon reflection and impinges on the camera 18. The image thus photographed is thereafter processed in the same manner as in the first embodiment.

With use of the present embodiment, the shape of contact patch and contact pressure distribution of the tire can be observed dynamically.

In the present embodiment, the sheet 15 adhered to the outer periphery of the tire 9 may alternatively be affixed to the surface of the contact member 3.

FIG. 6 shows another embodiment of the invention, which comprises a contact member 3 in the form of a drum 3 to provide a movable pavement assembly 53 of the rotary type. This permits observation of the contact pressure distribution of tires in high-speed rotation. In this case, the sheet 15 can be provided around the outer periphery of the contact member 3 or the tire 9.

The present invention is not limited to the embodiments described above.

What is claimed is:

1. An apparatus for determining the shape of contact patch of a tire and the contact pressure thereof characterized in that the apparatus comprises:
   a contact member made of a transparent material,
   a pressing unit for pressing the outer peripheral surface of the tire against the contact member,
   a sheet having elastic projections arranged regularly on one surface thereof and uniformly distributed thereover, and
   an observation device for observing through the contact member the projections as deformed when the tire is pressed against the contact member with the sheet interposed therebetween and with the projections thereof facing the contact member.

2. An apparatus as defined in claim 1 wherein the sheet comprises a base of uniform thickness, the base having a flat surface over one side thereof and the elastic projections over the other side thereof, the projections being so shaped that when the sheet is subjected to a pressure on the flat side of the base with the tips of the projections in contact with a planar surface, the area of contact of the projections with the planar surface varies with the pressure.

3. An apparatus as defined in claim 1 wherein the sheet is made of rubber and has a light color over the surface having the projections.

4. An apparatus as defined in claim 1 wherein the projections are semispherical in shape and are arranged closely.

5. An apparatus as defined in claim 1 wherein the contact member comprises a transparent glass plate having a uniform thickness and is provided at outer ends thereof with lamps, the lamps being so disposed that the light therefrom is confined within the thickness of the glass plate without emerging from the surface of the glass plate.

6. An apparatus as defined in claim 1 wherein the sheet is provided on the surface of the contact member with the projections thereof in contact with the contact member surface.

7. An apparatus as defined in claim 1 wherein the contact member is attached to a mount rotatable about a horizontal axis so as to position the surface of the contact member approximately vertically, the pressing unit being positioned in front of the contact member, the pressing unit comprising a saddle horizontally movable toward the contact member for removably mounting the tire thereon with the axis of the tire positioned vertically, and drive means for moving the saddle.

8. An apparatus as defined in claim 7 wherein the saddle is coupled to the drive means by load detecting means, and the drive means has connected thereto a control unit for controlling the drive means so that the value detected by the load detecting means is made a predetermined value.

9. An apparatus as defined in claim 1 wherein the observation device comprises image pickup means disposed in the rear of the contact member, an image processing unit for processing the image from the image pickup means, and a computer for controlling the image processing unit.

10. An apparatus as defined in claim 1 wherein the contact member comprises a transparent glass plate having a uniform thickness, the glass plate being provided on a support so as to be movable horizontally with its surface positioned horizontally, and the pressing unit holds the tire with its axis positioned horizontally and presses the surface of the tire against the contact member with the sheet interposed therebetween.

11. An apparatus as defined in claim 10 wherein the pressing member comprises a frame fixed to a floor, a slide provided on the fixed frame and movable upward and downward, and a pivotal arm assembly provided on the slide for removably and rotatably supporting the tire as rimmed and inflated to a specified internal pressure to render the camber angle and slip angle of the tire adjustable.

12. An apparatus as defined in claim 1 wherein the sheet is provided around the outer peripheral surface of the tire.

13. An apparatus as defined in claim 1 wherein the contact member is a rotary drum in the form of a hollow cylinder, and the pressing unit is disposed outside the contact member, the observation device being disposed inside the contact member.

* * * * *